(12) United States Patent
Desai et al.

(10) Patent No.: US 11,099,938 B2
(45) Date of Patent: Aug. 24, 2021

(54) SYSTEM AND METHOD FOR CREATING LINKED CLONES OF STORAGE OBJECTS WITH SURFACE SNAPSHOTS

(71) Applicant: VMware, Inc., Palo Alto, CA (US)

(72) Inventors: Asit Desai, Palo Alto, CA (US); Derek Uluski, Palo Alto, CA (US); Alexander T. Garthwaite, South Hamilton, MA (US); Sunil Satnur, Palo Alto, CA (US); Ilya Languev, Palo Alto, CA (US); Anoop Jaishankar, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 199 days.

(21) Appl. No.: 16/051,456

(22) Filed: Jul. 31, 2018

(65) Prior Publication Data
US 2020/0042396 A1    Feb. 6, 2020

(51) Int. Cl.
*G06F 11/00* (2006.01)
*G06F 11/14* (2006.01)
*G06F 3/06* (2006.01)
*G06F 16/11* (2019.01)
*G06F 16/901* (2019.01)

(52) U.S. Cl.
CPC .......... *G06F 11/1451* (2013.01); *G06F 3/067* (2013.01); *G06F 3/0614* (2013.01); *G06F 3/0664* (2013.01); *G06F 11/1464* (2013.01); *G06F 16/128* (2019.01); *G06F 16/9027* (2019.01); *G06F 2201/84* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,261,865 B1* | 4/2019 | Bajaj | ................... | G06F 11/1469 |
| 10,318,495 B2* | 6/2019 | Talagala | ................ | G06F 3/0616 |
| 10,515,192 B2* | 12/2019 | Wang | ................... | G06F 21/105 |
| 2014/0089264 A1* | 3/2014 | Talagala | ................ | G06F 3/0616 |
| | | | | 707/649 |
| 2014/0189534 A1* | 7/2014 | Liu | ....................... | G06F 16/957 |
| | | | | 715/753 |
| 2017/0031769 A1* | 2/2017 | Zheng | ................. | G06F 11/1471 |
| 2017/0031774 A1* | 2/2017 | Bolen | ................... | G06F 3/0619 |
| 2017/0052717 A1* | 2/2017 | Rawat | ................... | G06F 16/128 |
| 2017/0220777 A1* | 8/2017 | Wang | .................. | G06F 21/105 |
| 2017/0315728 A1* | 11/2017 | Zheng | ................... | G06F 3/0604 |
| 2017/0315878 A1* | 11/2017 | Purohit | .................. | G06F 3/067 |
| 2018/0137014 A1* | 5/2018 | Li | ....................... | G06F 11/1458 |

\* cited by examiner

*Primary Examiner* — Farhan M Syed
(74) *Attorney, Agent, or Firm* — Loza & Loza, LLP

(57) ABSTRACT

System and method for creating linked clones of storage objects stored in a storage uses a target storage structure that includes a linked clone being created from a selected snapshot of a storage object and surface snapshots. The linked clone is created in the target storage structure with references to the selected snapshot of the storage object in a source storage structure without completely copying the selected snapshot to the target storage structure. The surface snapshots, which correspond to other snapshots of the storage object in the source storage structure, are created in the target storage structure with references to the other snapshots without completely copying the other snapshots to the target storage structure to produce the linked clone with similar snapshots as the storage object at a point in time when the selected snapshot was captured.

15 Claims, 12 Drawing Sheets

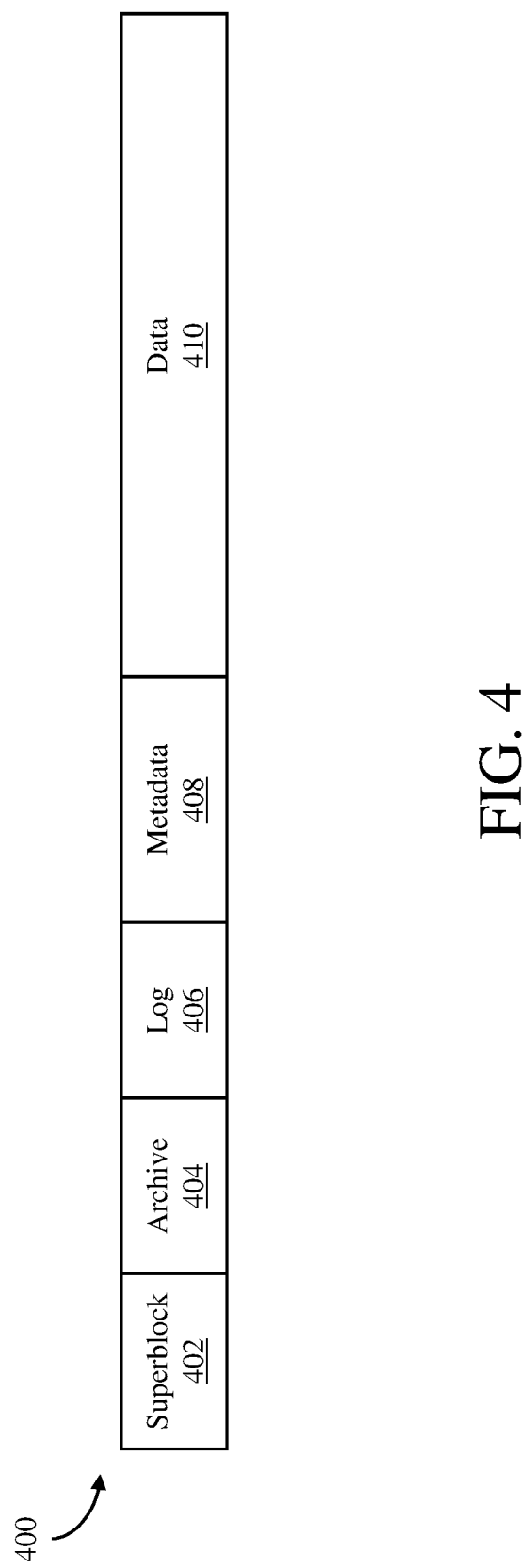

SYSTEM AND METHOD FOR CREATING LINKED CLONES OF STORAGE OBJECTS WITH SURFACE SNAPSHOTS

BACKGROUND

Snapshot technology is commonly used to preserve point-in-time (PIT) state and data of a virtual computing instance (VCI), such as a virtual machine. Snapshots of virtual computing instances are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involve creating a chain or series of snapshots to maintain changes to the underlying data using a B tree structure, such as a B+ tree structure. Significant advantage of the tree-based snapshot techniques over the redo-log based snapshot techniques is the scalability of the tree-based snapshot techniques. However, the snapshot structure of the tree-based snapshot techniques is intertwined and complex, especially when snapshot sizes and snapshot numbers are large. Thus, an important aspect of a snapshot system using a tree-based snapshot technique is managing the snapshots of storage objects for various applications, including copying or cloning the storage objects using the snapshots to create new replicated storage objects.

BRIEF DESCRIPTION OF THE DRAWINGS

FIG. 4 is a block diagram of a UPIT structure in accordance with an embodiment of the invention.

Throughout the description, similar reference numbers may be used to identify similar elements.

DETAILED DESCRIPTION

Figure 1:
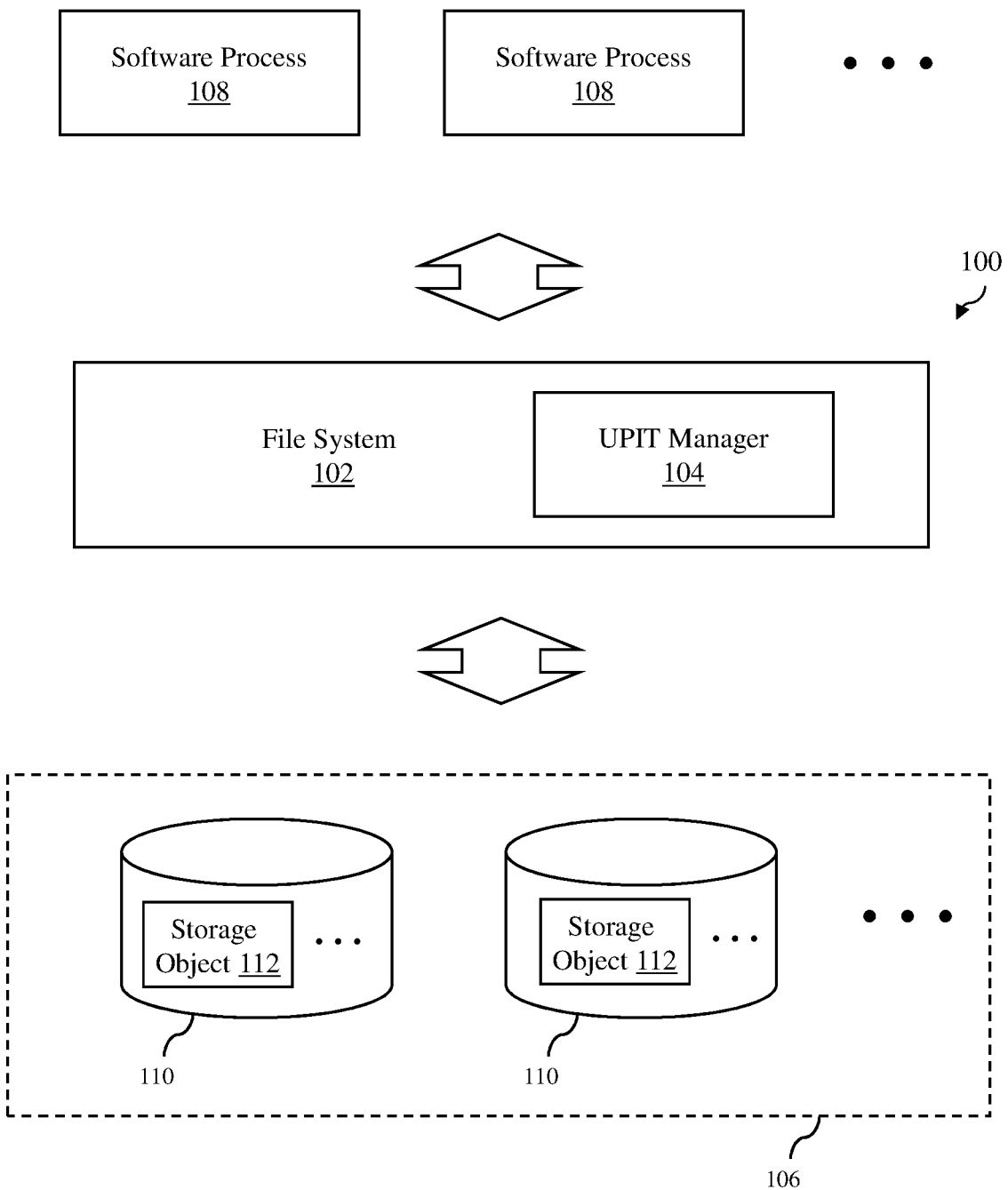
FIG. 1 is a block diagram of a computer system in accordance with an embodiment of the invention.

FIG. 1 depicts a computer system 100 in accordance with an embodiment of the invention. The computer system 100 is shown to include a file system 102 with a universal point-in-time (UPIT) manager 104 and a storage system 106. Other components of the computer system 100 that are commonly found in conventional computer systems, such as memory and processors, are not shown in FIG. 1. The computer system 100 allows software processes 108 to perform file system operations, such as creating/reading/writing/deleting data in the storage system 106, e.g., directories, folders, files and other storage objects, and to perform snapshot operations, such as creating/deleting snapshots of the data in the storage system 106. As described in detail below, the computer system 100 operates to manage snapshots of storage objects to ensure consistency and prevent data corruptions. In addition, the computer system 100 allows copying or cloning storage objects using snapshots of the storage objects to create new replicated storage objects.

The software processes 108 can be any software program, applications or software routines that can run on one or more computers, which can be physical computers, virtual computers, such as VMware virtual machines, or distributed computer systems. The software processes 108 may initiate various data storage operations, such as read, write, delete and rename operations, for data stored in the storage system 106, which are then executed by the computer system 100. In addition, the software processes 108 may also initiate various snapshot operations, such as creating and deleting snapshots for data stored in the storage system 106.

The storage system 106 includes one or more computer data storage devices 110, which are used by the computer system 100 to store data, including metadata of storage objects 112 and actual data of the storage objects 112. In some embodiments, a single storage object may be distributed among multiple storage devices. The data storage devices can be any type of non-volatile storage devices that are commonly used for data storage. As an example, the data storage devices may be, but not limited to, solid-state devices (SSDs), hard disks or a combination of the two.

In an embodiment, the storage system 106 may be a local storage system of the computer system 100, such as hard drive disks in a physical server-grade computer. In another embodiment, the storage system 106 may be a distributed storage system such as a storage area network (SAN). In still another embodiment, the storage system 106 may be a collection of local storage systems of physical computers (not shown) in the computer system 100, such as hard drive disks in a personal computer system, which forms a virtual SAN. In still another embodiment, the storage system 106 may be a remote storage system that can be accessed via a network, such as a network-attached storage (NAS). Depending on the embodiment, the storage system 106 may include other components commonly found in those types of storage systems, such as network adapters, storage drivers and/or storage management servers. The storage system 106 may be scalable, and thus, the number of data storage devices 110 included in the storage system can be changed as needed to increase or decrease the capacity of the storage system to support increase/decrease in workload. Consequently, the exact number of data storage devices 110 included in the storage system 106 can vary from one to hundreds or more.

The storage system 106 may be used to store data in any logical storage units, such as file systems, files, groups of files, datastores, logical unit number (LUN) objects and virtual volumes (VVOLs). In addition, the storage system 106 may be used to store snapshots of any of these logical storage units or snapshots of applications using the data storage, such as virtual computing instances. As used herein, the term "virtual computing instance" is any software entity that can run on a computer system, such as a software application, a software process, a virtual machine and a "container" that provides system-level process isolation, such as a Docker container. Snapshots of virtual computing instances can be viewed as "images" of the virtual computer instances at the time when the snapshots were taken or created. As an example, a snapshot of a virtual machine is a copy of the non-volatile memory or virtual disk of the virtual machine, as well as the volatile memory of the virtual machine, at the time the snapshot was taken. A virtual machine snapshot may also include the configuration or settings of the virtual machine and the BIOS configuration at the time the snapshot was taken.

The file system 102 operates to manage file system operations to and from the software processes 108 and the storage system 106 for storage objects, such as file system volumes, file directories/folders, and files, for shared use of the storage system 106. Thus, the file system 102 organizes the storage resources of the storage system 106 into the file system structures so that the software processes 108 can access the storage objects for various storage operations, such as creating file system objects, deleting file system objects, writing or storing file system objects, reading or retrieving file system objects and renaming file system objects.

The UPIT manager 104 of the file system 102 operates to manage snapshots of storage objects stored in the storage system 106. The UPIT manager 104 manages the creation and deletion of snapshots of storage objects stored in the storage system. The UPIT manager 104 also supports various bookkeeping operations with respect to the snapshots, such as generating identifiers for the snapshots. As explained in more detail below, at least some storage objects and their snapshots are maintained in storage structures referred to herein as UPIT structures, which are stored in the storage system 106, such that each storage object and its snapshots are contained in a single storage structure. The UPIT manager 104 interacts with the UPIT structures to ensure snapshots are created and deleted in these UPIT structures. The UPIT manager 104 also manages linked clones that are created from snapshots of storage objects in UPIT structures, as described in more detail below.

Figure 2A:
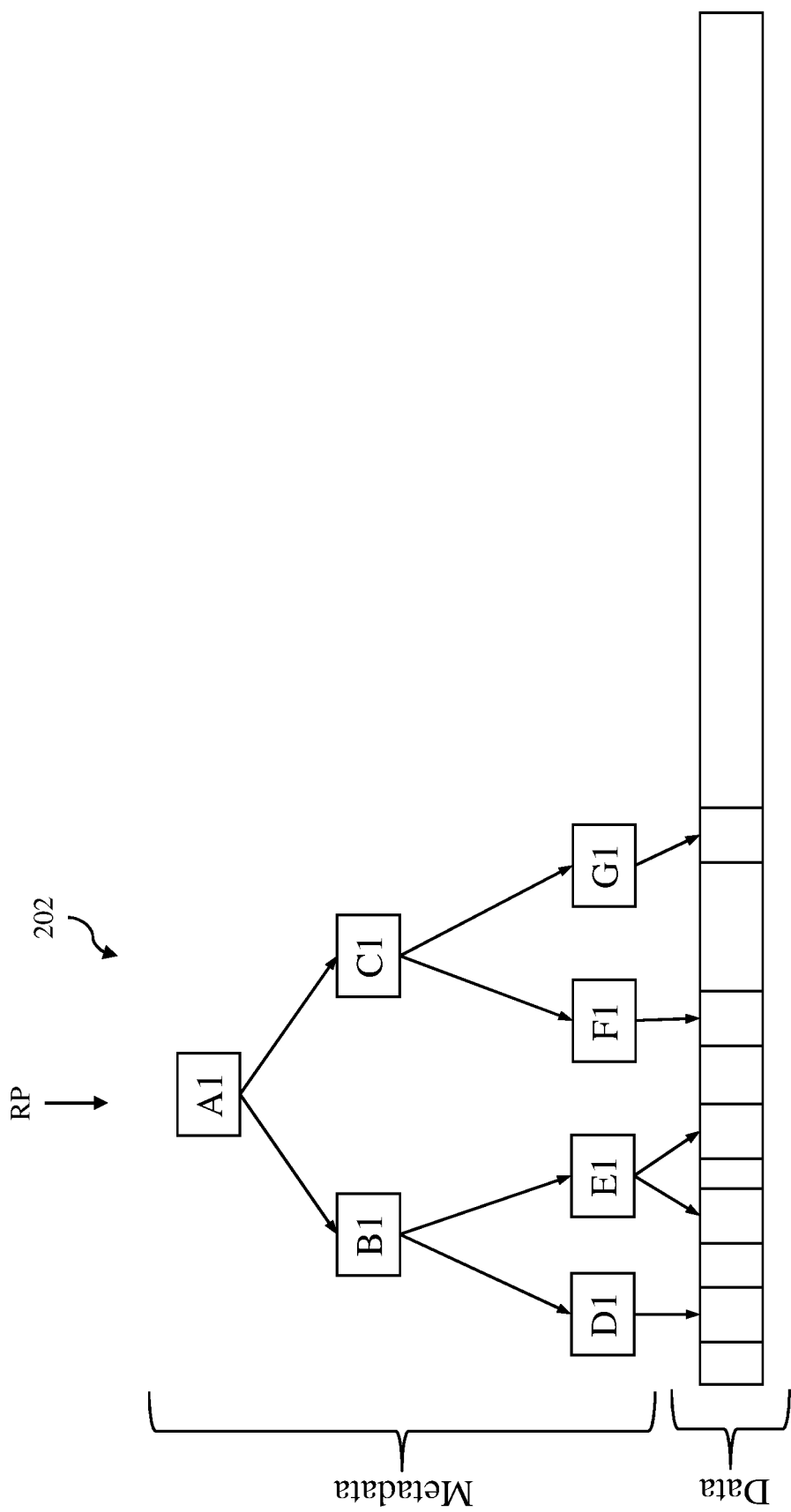
FIGS. 2A-2C illustrate a copy-on-write (COW) B+ tree structure for one storage object managed by a universal point-in-time (UPIT) manager of the computer system in accordance with an embodiment of the invention.
Figure 2B:
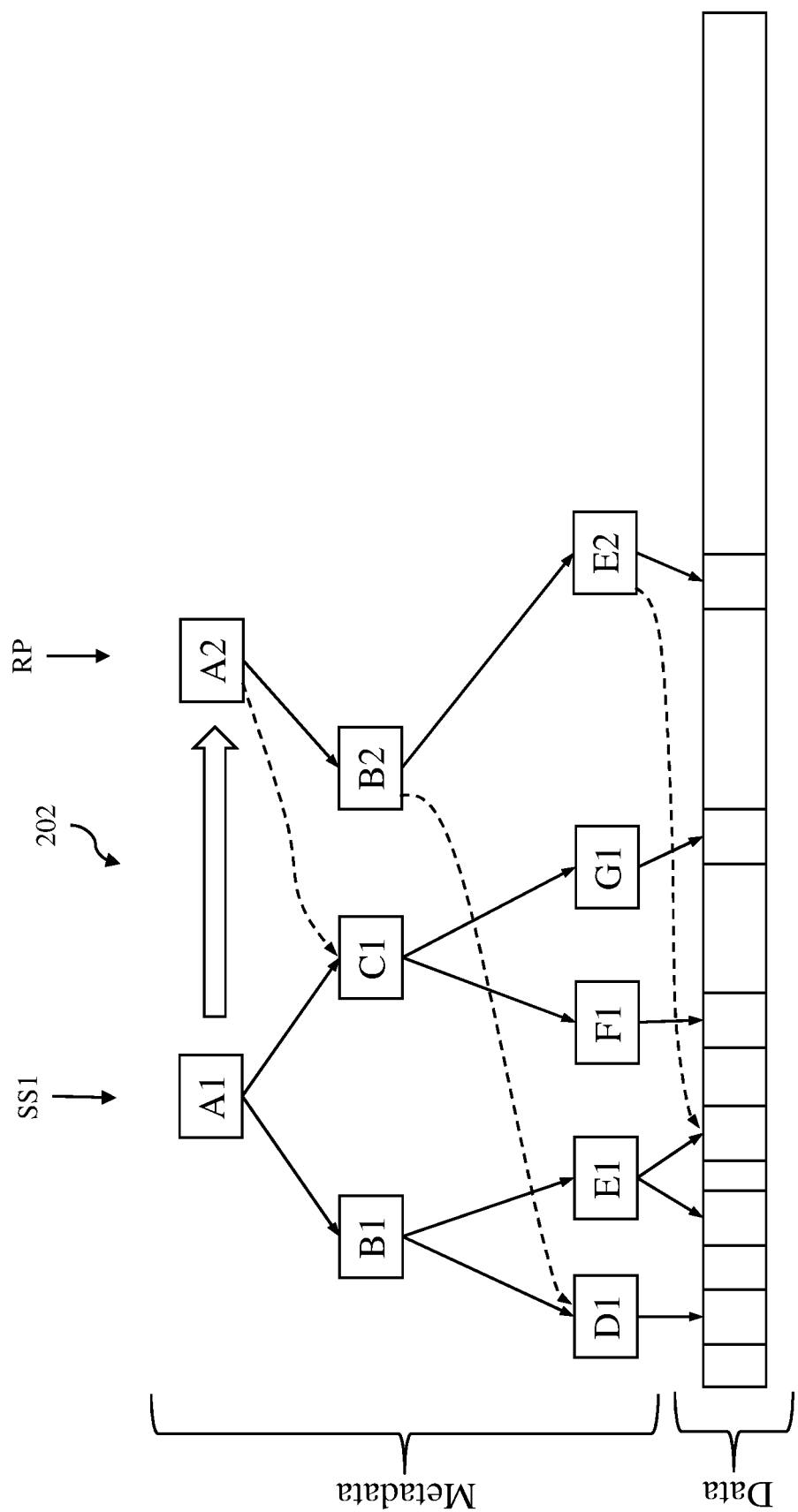
Figure 2C:
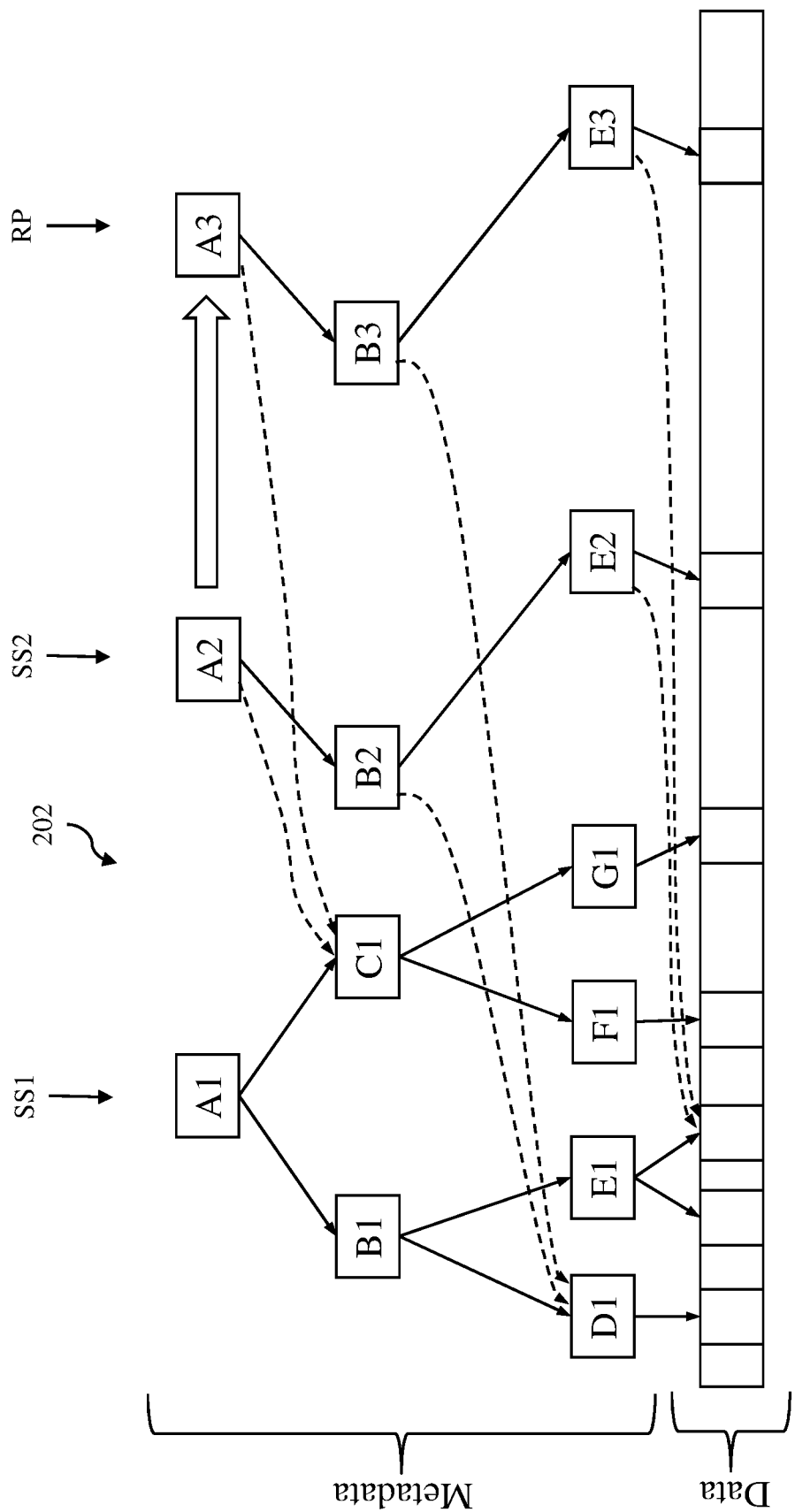

The UPIT manager 104 leverages B tree structures, such as copy-on-write (COW) B+ tree structures, to organize storage objects and their snapshots taken at different times. A COW B+ tree structure for one storage object managed by the UPIT manager 104 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the storage system 106.

FIG. 2A shows the storage object before any snapshots of the storage object were taken. The storage object comprises data, which is stored in data blocks in the storage system 106, as defined by a B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other index nodes. Each leaf node records the mapping from logic block address (LBA) to the physical location or address in the storage system. Each node in the B+ tree structure may include a node header and a number of references or entries. The node header may include information regarding that particular node, such as an identification (ID) of the node. Each entry in the leaf nodes may include an LBA, the entry type (e.g., private or shared), physical extent location, checksum and other characteristics of the data for this entry. In FIG. 2A, the nodes A1-G1 are modifiable. Thus, the tree with the nodes A1-G1 can be viewed as the current state or running point (RP) of the storage object.

FIG. 2B shows the storage object after a first snapshot SS1 of the storage object was taken. Once the first snapshot SS1 is created or taken, all the nodes in the B+ tree structure become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In an embodiment, the first snapshot of a storage object may include a snapshot generation identification, such as a number, and data regarding all the nodes in the B+ tree structure, e.g., the nodes A1-G1 in the example shown in FIG. 2B. When a modification of the storage object is made, after the first snapshot is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot include a snapshot generation identification, such as a number, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3A:
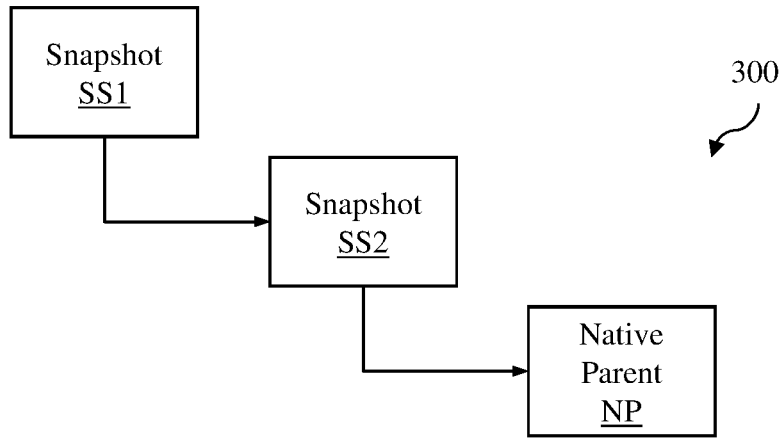
FIGS. 3A and 3B illustrate snapshot hierarchy and relationship in accordance with an embodiment of the invention.

In this manner, multiple snapshots of a storage object can be created at different times. These multiple snapshots create a hierarchy of snapshots. FIG. 3A illustrates a hierarchy 300 of snapshots for the example described above with respect to FIGS. 2A-2C. As shown in FIG. 3A, the hierarchy 300 includes a first snapshot SS1, a second snapshot SS2 and a native parent NP. The native parent NP is the current state of the storage object, which is the same as the running point for the storage object. Thus, the snapshot hierarchy 300 illustrates how snapshots of a storage object can be visualized.

Figure 3B:
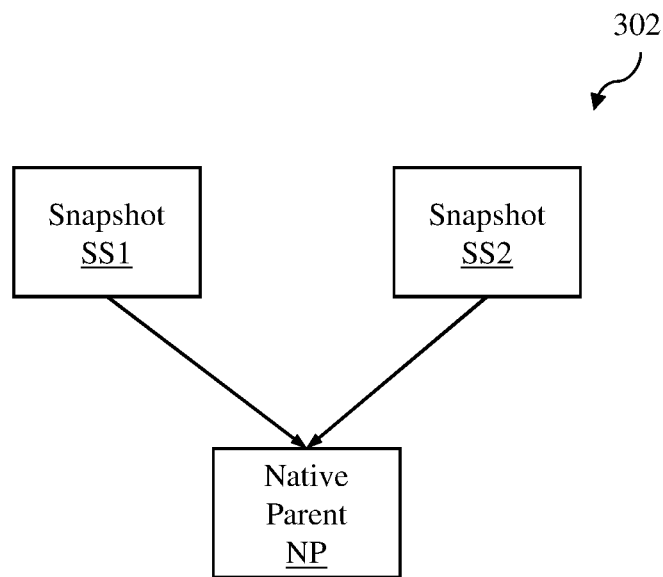

Each snapshot of a storage object can be viewed as a child of a native parent since each snapshot is a point-in-time representation of the native parent and is derived from the native parent. In an embodiment, all the snapshots of a storage object can be referenced by the storage object. Thus, the storage object can maintain a record of the snapshots of the storage object. This relationship 302 is illustrated in FIG. 3B, which shows that the first and second snapshots SS1 and SS2 are referenced by the native parent NP.

Unlike conventional snapshots of storage objects, which are maintained as separate storage objects, the file system 102 and the UPIT manager 104 use a single storage structure to store the native parent and all referenced snapshots for each storage object. Thus, all the information regarding all the snapshots of a storage object is contained in the single structure, which will be referred to herein as universal point-in-time (UPIT) structure. In an embodiment, the UPIT structure includes a directory of snapshots contained in the UPIT structure, and associated with each of these individual points in time or snapshots is a reference count that indicates inter alia the number of linked clones created off of that snapshot.

Turning now to FIG. 4, a UPIT structure 400 in accordance with an embodiment of the invention is shown. The UPIT structure 400 includes a superblock section 402, an archive section 404, a log section 406, a metadata section 408 and a data section 410. The superblock section includes information regarding checkpointing information. The archive section includes information regarding historical and current snapshots, such as creation and deletion of snapshots at different points in time. The archive section also includes information regarding linked clones that have been created from the snapshots in the UPIT structure 400. The log section includes logs of input/output (I/O) operations for the UPIT structure 400 (e.g., insert and delete data operations). The metadata section includes information regarding the nodes of the B+ tree structure being used to store the data. Thus, the metadata section includes all the nodes of the snapshots and the native parent, some of which are shared by the snapshots and the native parent. The data section includes the data being stored in the UPIT structure. Thus, the data section includes data for the snapshots and the native parent.

The file system 102 and the UPIT manager 104 allow multiple software processes to create snapshots for a storage object in UPIT structures. Thus, a UPIT structure for a particular storage object may include some snapshots created by one software process and other snapshots created by another software process. For a storage object of a virtual machine, such as the namespace object (where descriptor files for the virtual machine are stored) and the virtual disk object (where a virtual disk of the virtual machine is stored), a virtualization software in a host computer supporting that virtual machine may create snapshots in the UPIT structure for that storage object in response to a user request (referred to herein as "managed snapshots") and a data protection module, running on any computer system, may create additional snapshots in the same UPIT structure for recovery and replication (referred to herein as "unmanaged snapshots"). The unmanaged snapshots may be automatically created by the data protection module. The managed snapshots can be viewed as user-initiated snapshots of storage objects via virtualization software, for example, using VMware vSphere® product.

The snapshots of a storage object in a UPIT structure can be used to replicate the storage object at a particular point in time. One efficient technique to replicate storage objects in UPIT structures involves the creation of linked clones. A linked clone is a copy of a storage object, such as a namespace or virtual disk object of a virtual machine, created from a snapshot of that storage object in a UPIT structure, which may be stored in another UPIT structure. Rather than a complete copy of a storage object, a linked clone is a shallow copy of the storage object with links to data and metadata in the parent storage object to expediate the copying process and reduce the amount of storage needed for the linked clone. Thus, a linked clone has access to all the files of the parent storage object, but all these files of the parent storage object are not copied when the linked clone is created. In addition to data and metadata of a storage object, a linked clone in accordance with an embodiment of the invention has access to all the managed snapshots of the storage object in a snapshot hierarchy at a particular moment in time, i.e., when the snapshot used to create the linked clone was captured.

As noted above, managed and unmanaged snapshots may be created for a storage object in a UPIT structure at various points in time. Thus, at different points in time, the storage object in question may have had different managed snapshots in various snapshot hierarchies. If a linked clone of a storage object at a particular point in time is to be created with its snapshot hierarchy of managed snapshots, the information regarding the managed snapshots of the snapshot at that particular point in time must be obtained to replicate the snapshot hierarchy for the linked clone.

In an embodiment, for each snapshot of a storage object in a UPIT structure, at least three pieces of information can be maintained, which may be recorded in the UPIT structure by the UPIT manager 104. The first piece of information for each snapshot is snapshot creation information, which includes a creation identifier and a generation number. The second piece of information for each snapshot is whether the snapshot created is a managed snapshot of the storage object or an unmanaged snapshot of the storage object. As an example, this information can be implemented using a flag in the UPIT structure for each snapshot. The third piece of information for each snapshot is snapshot deletion information, which includes a deletion identifier and a generation number. The generation numbers are increased for each snapshot creation or for each snapshot deletion. By keeping track of relative timing information of creation and deletion of managed and unmanaged snapshots, the UPIT manager 104 is able to track the managed snapshots as they are created and deleted so that the snapshot hierarchy of existing managed snapshots of the storage object can be determined for different points in time.

Figure 5:
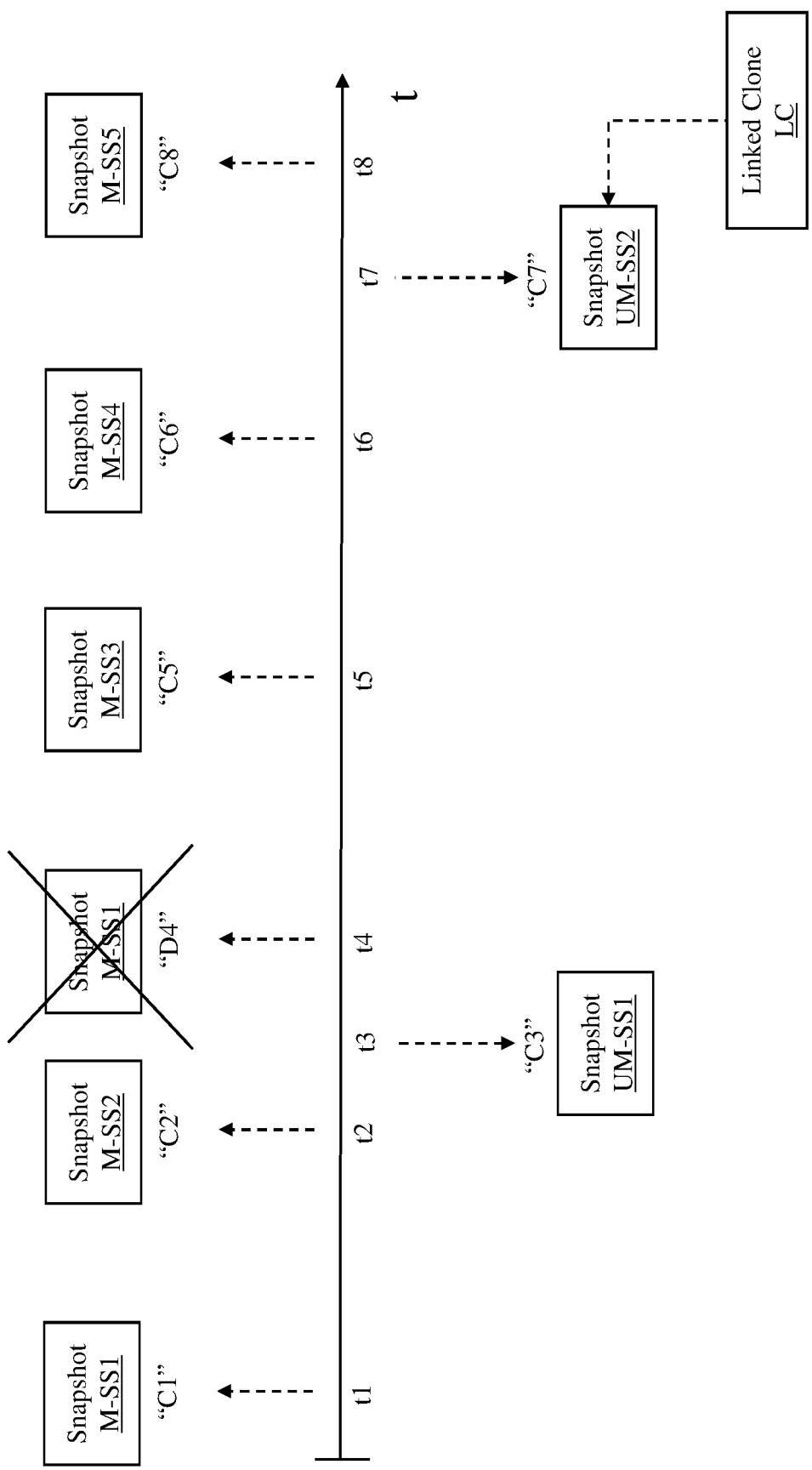
FIG. 5 shows a timeline of managed and unmanaged snapshots of a single storage object in a UPIT structure using creating and deletion information in accordance with an embodiment of the invention.

The use of creation and deletion information by the file system 102 is further described using an example illustrated in FIG. 5, which shows a timeline of managed and unmanaged snapshots for a single storage object in a UPIT structure.

At t=t1, a managed snapshot M-SS1 is created in response to a create request by a user. The creation of the managed snapshot M-SS1 will be recorded in the UPIT structure, e.g., in the archive section, using a snapshot identification for the snapshot with a managed snapshot identifier, a create identifier "C" and a generation number of "1".

At t=t2, another managed snapshot M-SS2 is created in response to a create request by a user. The creation of the managed snapshot M-SS2 will be recorded in the UPIT structure, e.g., in the archive section, using a snapshot identification for the snapshot with a managed snapshot identifier, a create identifier "C" and a generation number of "2".

At t=t3, an unmanaged snapshot UM-SS1 is created by a data protection module. The creation of the unmanaged snapshot UM-SS1 is recorded in the UPIT structure, e.g., in the archive section, using a snapshot identification for the snapshot with an unmanaged snapshot identifier, a create identifier "C" and a generation number of "3". At t=t3, there are two existing managed snapshots for the storage object, i.e., the managed snapshots M-SS1 and M-SS2. Thus, if a linked clone is created from the unmanaged snapshot UM-SS1, the snapshot hierarchy for the linked clone will include the managed snapshots M-SS1 and M-SS2.

At t=t4, the managed snapshot M-SS1 is deleted in response to a deletion request by the user. This deletion of the managed snapshot M-SS1 is recorded in the UPIT structure, e.g., in the archive section, using the snapshot identification for the snapshot with a delete identifier "D" and a generation number of "4".

At t=t5, another managed snapshot M-SS3 is created in response to a create request by a user. The creation of the managed snapshot M-SS3 will be recorded in the UPIT structure, e.g., in the archive section, using a snapshot identification for the snapshot with a managed snapshot identifier, a create identifier "C" and a generation number of "5".

At t=t6, another managed snapshot M-SS4 is created in response to a create request by a user. The creation of the managed snapshot M-SS4 will be recorded in the UPIT structure, e.g., in the archive section, using a snapshot identification for the snapshot with a managed snapshot identifier, a create identifier "C" and a generation number of "6".

At t=t7, an unmanaged snapshot UM-SS2 is created by the data protection module. The creation of the unmanaged snapshot UM-SS2 is recorded in the UPIT structure, e.g., in the archive section, using a snapshot identification for the snapshot with an unmanaged snapshot identifier, a create identifier "C" and a generation number of "7". At t=t7, there are three valid or existing managed snapshots for the storage object, i.e., the managed snapshots M-SS2, M-SS3 and M-SS4. Thus, if a linked clone is created from the unmanaged snapshot UM-SS2, the snapshot hierarchy for the linked clone will include the managed snapshots M-SS2, M-SS3 and M-SS4.

At t=t8, another managed snapshot M-SS5 is created in response to a create request by a user. The creation of the managed snapshot M-SS5 will be recorded in the UPIT structure, e.g., in the archive section, using a snapshot identification for the snapshot with a managed snapshot identifier, a create identifier "C" and a generation number of "8".

In the timeline illustrated in FIG. 5, a linked clone LC of the storage object is created using the unmanaged snapshot UM-SS2. The linked clone LC can be created at any time after t=t7. As an example, the linked clone LC may be created after t=t8. The creation of the linked clone LC from the unmanaged snapshot UM-SS2 involves linking the unmanaged snapshot UM-SS2 to the linked clone LC, as well as creating surface snapshots that correspond to the managed snapshots M-SS2, M-SS3 and M-SS4 with links to the managed snapshots, which are included in a new UPIT structure. As described in more detail below, a surface snapshot of a linked clone is a pseudo copy of a snapshot, which uses reference links to the snapshot being copied so that all the data and metadata of the snapshot do not actually have to be copied into the linked clone. This is illustrated in FIG. 6 using the snapshots of a storage object shown in FIG. 5.

Figure 6:
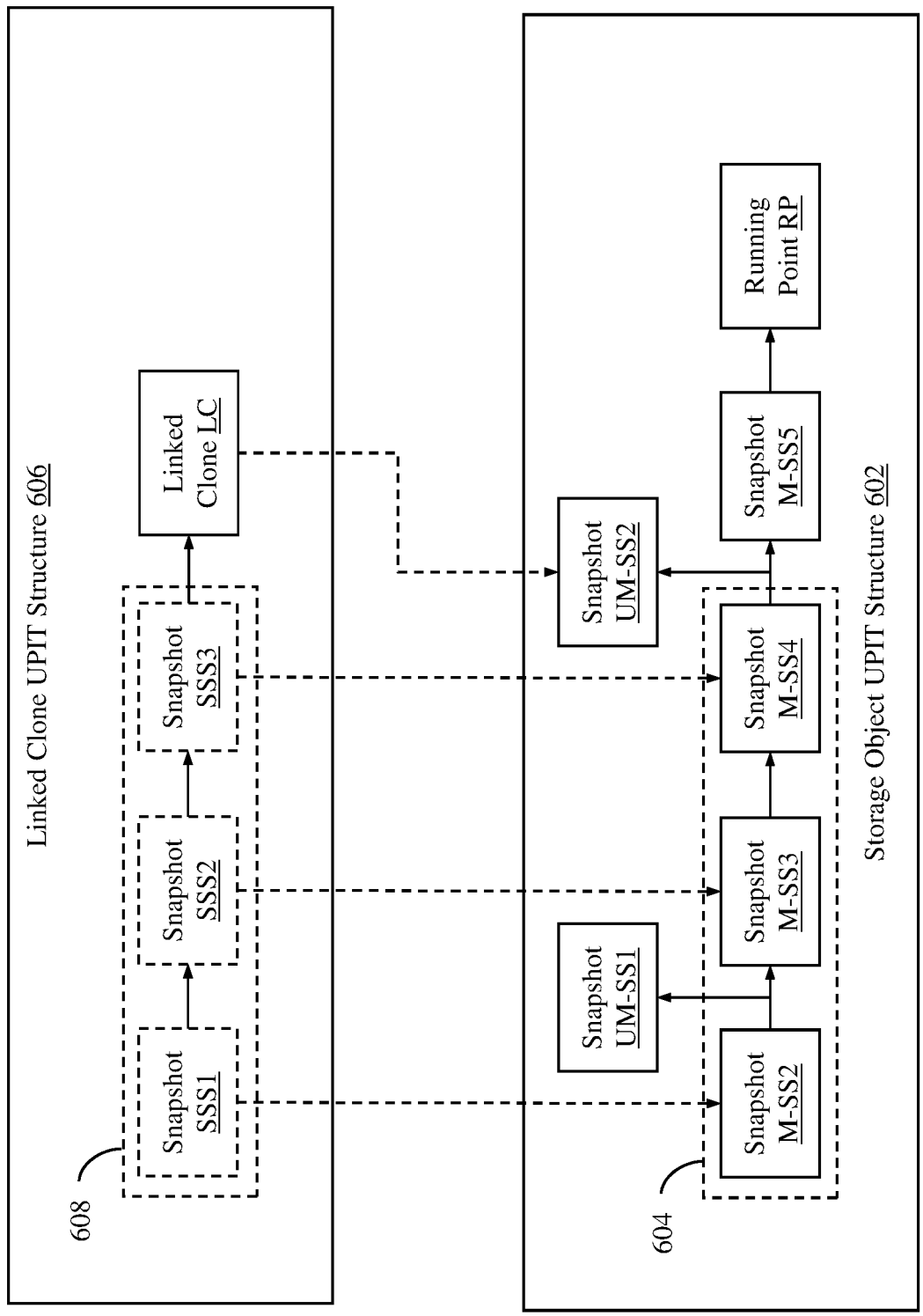
FIG. 6 illustrates reference links between a storage object UPIT structure, which includes an unmanaged snapshot used to create a linked clone and managed snapshots associated with the unmanaged snapshot, and a linked clone UPIT structure, which includes the linked clone and surface snapshots that correspond to the managed snapshots associated with the unmanaged snapshot, in accordance with an embodiment of the invention.

FIG. 6 shows a UPIT structure 602 for a source storage object, which includes a running point RP of the storage object and all existing snapshots of the storage object at t>t8, as illustrated in FIG. 5. Thus, the storage object UPIT structure 602 includes the managed snapshots M-SS2, M-SS3, M-SS4 and M-SS5, and the unmanaged snapshots UM-SS1 and UM-SS2. The managed snapshots M-SS2, M-SS3 and M-SS4 form a snapshot hierarchy 604 for the storage object at t=t7 when the unmanaged snapshot UM-SS2 was captured. The managed snapshot M-SS5 is excluded from the snapshot hierarchy 604 because the managed snapshot M-SS5 was captured after t=t7. Also shown in FIG. 6 is a UPIT structure 606 for the linked clone LC that was created using the unmanaged snapshot UM-SS2. Thus, the linked clone LC has a reference link to the unmanaged snapshot UM-SS2, which was used to create the linked clone LC, without copying all metadata and data of the unmanaged snapshot UM-SS2. The linked clone UPIT structure 606 also includes surface snapshots SSS1, SSS2 and SSS3 with reference links to the managed snapshots M-SS2, M-SS3 and M-SS4, respectively, in the storage object UPIT structure 602. These surface snapshots SSS1, SSS2 and SSS3 form a snapshot hierarchy 608, which is similar to the snapshot hierarchy 606 in the storage object UPIT structure 602. Surface snapshots do not have all the data and metadata of the linked snapshots. However, because of the reference links, the surface snapshots can be used to revert a linked clone back to the same state as the parent storage object at different points in time using the necessary data and metadata of the linked snapshots in the source storage object UPIT structure. Thus, the surface snapshots SSS1, SSS2 and SSS3 in the linked clone UPIT structure 606 allow the linked clone LC to have in effect the managed snapshots M-SS2, M-SS3 and M-SS4 of the snapshot hierarchy of the source storage object at the point in time when the unmanaged snapshot UM-SS2 was captured. The use of reference links rather than copying all the required B+ tree node data and storage object data for the snapshots M-SS2, M-SS3 and M-SS4 in the storage object UPIT structure 602 to the linked clone UPIT structure 604 significantly reduces the amount of time needed to create the linked clone LC and the surface snapshots SSS1, SSS2 and SSS3, and the amount of data that needs to be written into the linked clone UPIT structure 604.

In an embodiment, the linked clone LC includes only a copy of the root node of the B+ tree for the unmanaged snapshot UM-SS2 with the same reference links to other nodes as the actual root node of the B+ tree for the unmanaged snapshot UM-SS2. As an example, if the linked clone LC was created from the snapshot SS2 shown in FIG.

Figure 7:
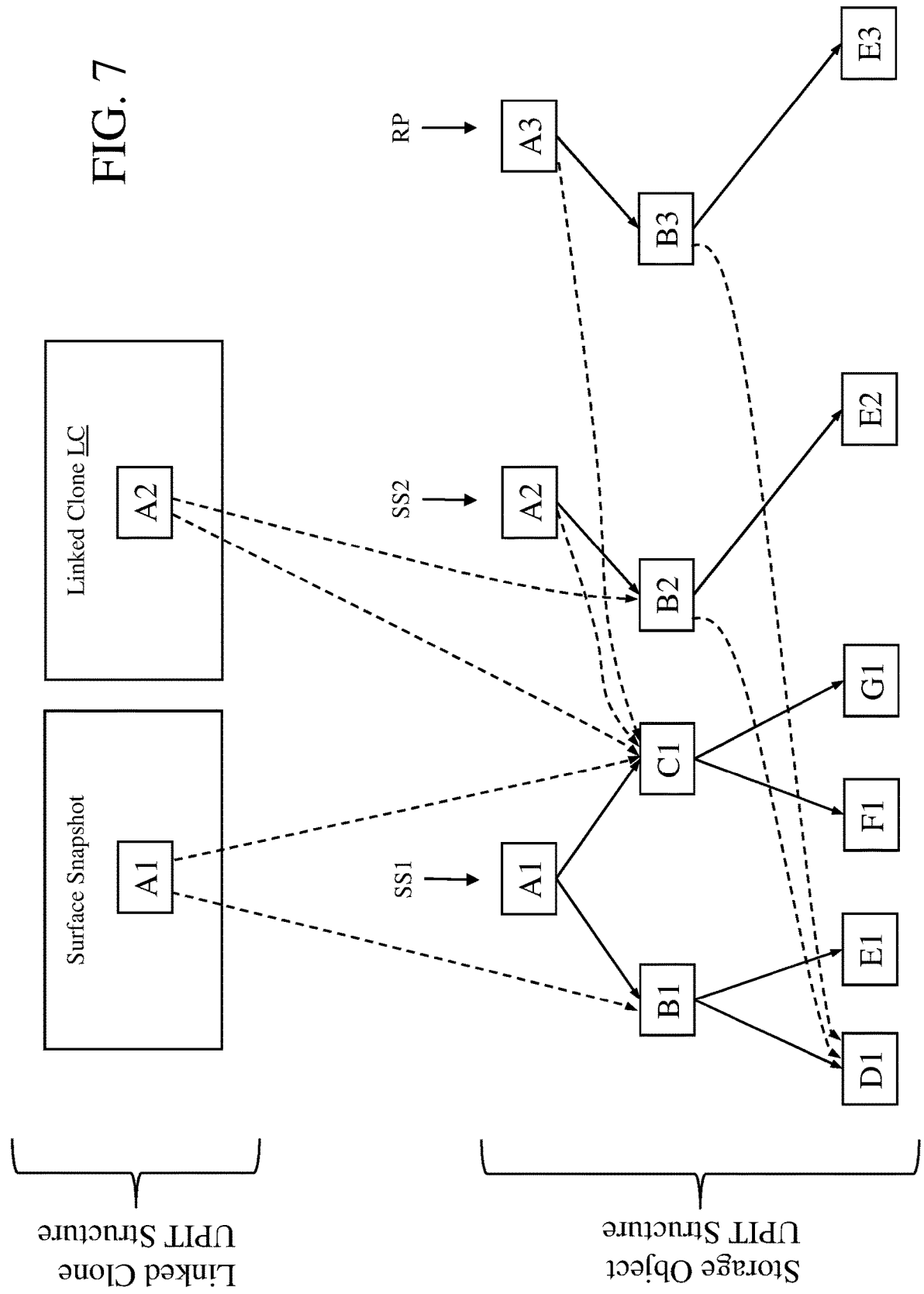
FIG. 7 illustrates root nodes of relevant snapshots in a storage object UPIT structure that are copied to a linked clone and a surface snapshot in a linked clone UPIT structure in accordance with an embodiment of the invention.

2C, which is reproduced in FIG. 7, then the linked clone LC would have a copy of the root node A2 with reference links to the nodes B2 and C1. However, the nodes B2 and C1 would not have been copied to the linked clone LC. Each of the surface snapshots SSS1, SSS2 and SSS3 includes only a copy of the root node of the B+ tree for the corresponding managed snapshot with the same reference links to other tree nodes as the original copied root node. Thus, the surface snapshots SSS1, SSS2 and SSS3 may only include copies of the root nodes of B+ trees for the managed snapshots M-SS2, M-SS3 and M-SS4, respectively, with the same reference links to other tree nodes as the original root nodes for the managed snapshots M-SS2, M-SS3 and M-SS4. As an example, if one of the surface snapshots SSS1, SSS2 and SSS3 was created from the snapshot SS1 shown in FIG. 2C, which is reproduced in FIG. 7, then the surface snapshot would have a copy of the root node A1 with reference links to the nodes B1 and C1. However, the nodes B1 and C1 would not have been copied to the surface snapshot.

In an embodiment, when the linked clone LC is created in the linked clone UPIT structure 606, information regarding the hierarchy 604 of the managed snapshots M-SS2, M-SS3 and M-SS4 in the storage object UPIT structure 602 may be used to similarly create the hierarchy 608 for the surface snapshots SSS1, SSS2 and SSS3 in the linked clone UPIT structure 606. The hierarchy 604 of the managed snapshots M-SS2, M-SS3 and M-SS4 can be recreated in the linked clone UPIT structure 606 using the creation generation numbers of the managed snapshots M-SS2, M-SS3 and M-SS4. Using these creation generation numbers, the hierarchy 608 of the surface snapshots SSS1, SSS2 and SSS3 in the linked clone UPIT structure 606 can be made to correspond to the hierarchy 604 of the managed snapshots M-SS2, M-SS3 and M-SS4. As an example, new creation generation numbers can be assigned to the surface snapshots SSS1, SSS2 and SSS3, which correspond to the order in which the managed snapshots M-SS2, M-SS3 and M-SS4 were created. Thus, the creation generation numbers of the surface snapshots SSS1, SSS2 and SSS3 in the linked clone UPIT structure 606, e.g., in the archive section, would indicate which surface snapshot is older or newer than another surface snapshot.

Figure 8:
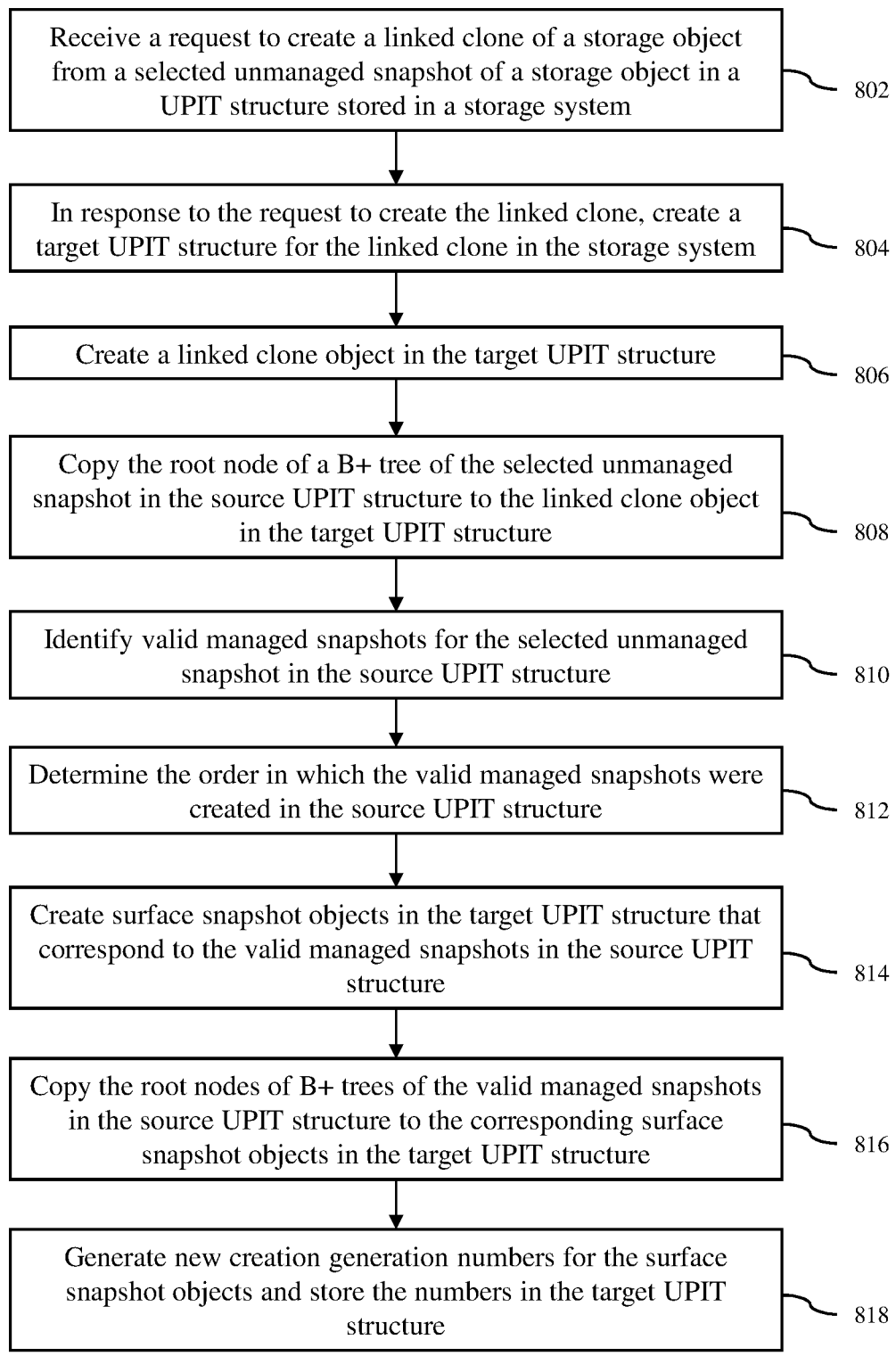
FIG. 8 is a flow diagram of an operation of the UPIT manager with respect to a request to create a linked clone of a storage object from an unmanaged snapshot of the storage object in a source UPIT structure in accordance with an embodiment of the invention.

The operation of the UPIT manager 104 with respect to a request to create a linked clone of a storage object from an unmanaged snapshot of the storage object in a source UPIT structure in accordance with an embodiment of the invention will now be described with reference to the flow diagram of FIG. 8. At block 802, a request to create a linked clone of a storage object from a selected unmanaged snapshot of a storage object in a UPIT structure stored in the storage system 106 is received at the file system 102 from a requesting entity. As an example, the request may be from a virtualization software running on a host computer that is supporting a virtual machine or a data protection module running on one or more computers in response to user input, which would identify the selected unmanaged snapshot from which to create the linked clone. Next, at block 804, in response to the request to create the linked clone, a target UPIT structure for the linked clone is created in the storage system 106 by the UPIT manager 104.

Next, at block 806, a linked clone object is created in the target UPIT structure by the UPIT manager 104. Next, at block 808, the root node of a B+ tree of the selected unmanaged snapshot in the source UPIT structure is copied to the linked clone object in the target UPIT structure by the UPIT manager 104. The copied root node includes references to other tree nodes associated with the selected unmanaged snapshot.

Next, at block 810, valid managed snapshots for the selected unmanaged snapshot in the source UPIT structure are identified by the UPIT manager 104. These valid managed snapshots are managed snapshots that have been created and not deleted before the point in time when the selected unmanaged snapshot was taken. In an embodiment, the creation and deletion generation numbers for managed snapshots in the source UPIT structure are processed to identify the valid managed snapshots.

Next, at block 812, the order in which the valid managed snapshots were created in the source UPIT structure is determined by the UPIT manager 104. In an embodiment, the creation generation numbers for the valid managed snapshots in the source UPIT structure are processed by the UPIT manager 104 to compute the order in which the valid managed snapshots were created in the source UPIT structure.

Next, at block 814, surface snapshot objects are created in the target UPIT structure that correspond to the valid managed snapshots in the source UPIT structure by the UPIT manager 104. Next, at block 816, the root nodes of B+ trees of the valid managed snapshots in the source UPIT structure are copied to the corresponding surface snapshot objects in the target UPIT structure by the UPIT manager 104. Next, at block 818, new creation generation numbers are generated for the surface snapshot objects and stored in the target UPIT structure, e.g., in the archive section, by the UPIT manager 104. In an embodiment, the creation generation numbers for the surface snapshot objects reflect the order in which the corresponding valid managed snapshots were created in the source UPIT structure.

In this manner, a linked clone of a storage object from an unmanaged snapshot of the storage object in a source UPIT structure is created in a target UPIT structure, which includes surface snapshots that correspond to managed snapshots in the source UPIT structure that were valid when the unmanaged snapshot of the storage object was captured. Since only root nodes of B+ trees for relevant snapshots in the source UPIT structure are copied to the linked clone and the surface snapshots, the described operation to create a linked clone significantly reduces the amount of time needed to create the linked clone with associated surface snapshots and the amount of data that needs to be written into the UPIT structure for the linked clone.

Figure 9:
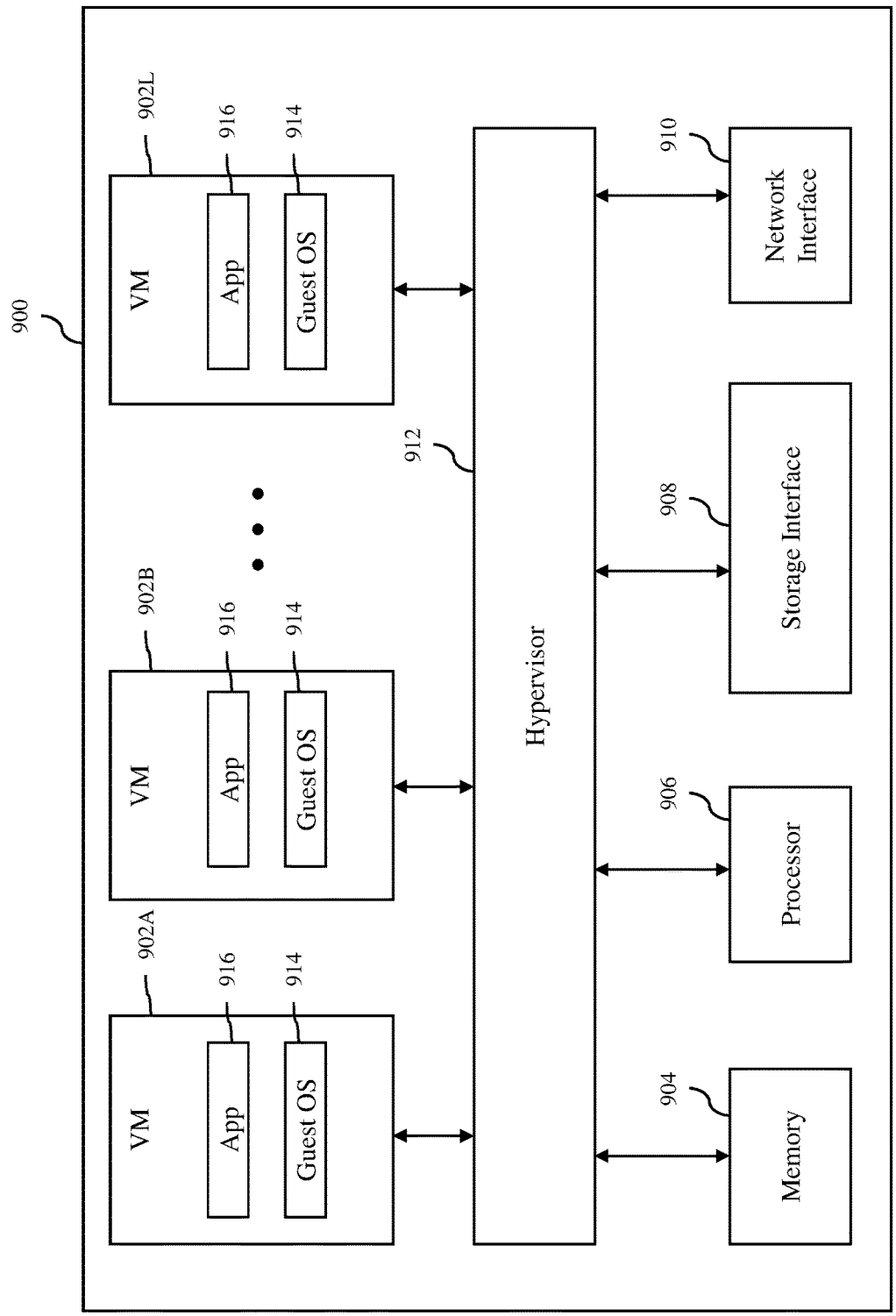
FIG. 9 is a block diagram of a physical computer system with a number of virtual machines in which the file system in accordance with an embodiment of the invention may be implemented.

The file system 102 may be implemented as part of an operating system (OS) of a computer system, which may be a physical computer system, such as a physical server, or a virtual computer system, such as a virtual machine. Turning now to FIG. 9, a physical computer system 900 in which the file system 102 may be implemented is shown. In FIG. 9, the physical connections between the various components of the computer system are not illustrated. As shown in FIG. 9, the physical computer system is configured to support a number of virtual machines (VMs) 902A, 902B . . . 902L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 904, one or more processors 906, a storage interface 908, and a network interface 910. Each system memory, which may be random access memory (RAM), is the volatile memory of the physical computer system. Each processor can be any type of a processor, such as a central processing unit (CPU) commonly found in a personal computer. The storage interface is an interface that allows the physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 902A, 902B ... 902L run on "top" of a hypervisor 912, which is a software interface layer that, using virtualization technology, enables sharing of the hardware resources of the physical computer system 900 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 914, one or more guest applications 916. The guest operating system manages virtual system resources made available to the corresponding VM by the hypervisor, and, among other things, the guest operating system forms a software platform on top of which the guest applications run.

The file system 102 may be implemented in one or more VMs 902A, 902B ... 902L running in the physical computer system 900 as part of their OS, i.e., the guest OS 914. Thus, in this implementation, the file system 102 allows guest applications 916 to access physical storage systems available to the physical computer system. The file system 102 may also be implemented in the physical computer system as part of the host OS. Thus, the file system 102 may be implemented in the OS of any physical or virtual computer system. In other embodiments, the file system 102 may be implemented as a distributed file system, where agents of the file system are installed in multiple physical or virtual computer systems.

Figure 10:
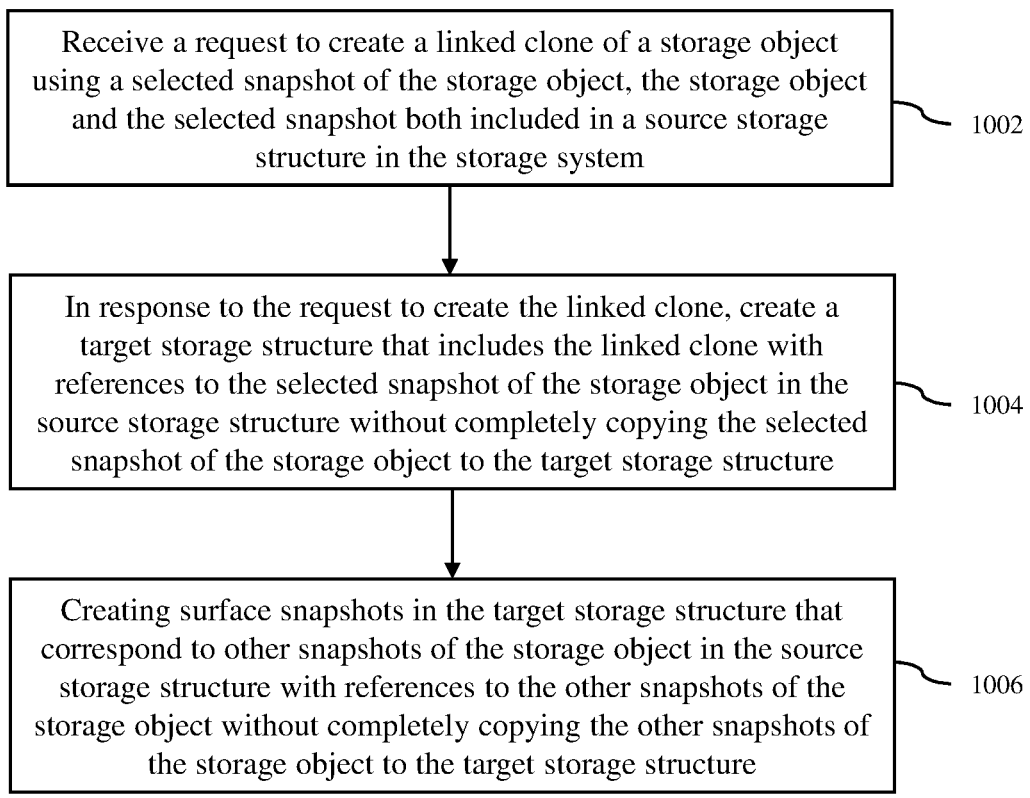
FIG. 10 is a flow diagram of a method for creating linked clones of storage objects stored in a storage system in accordance with an embodiment of the invention.

A method for creating linked clones of storage objects stored in a storage system in accordance with an embodiment of the invention is described with reference to a flow diagram of FIG. 10. At block 1002, a request to create a linked clone of a storage object stored in the storage system from a selected snapshot of the storage object is received at a file system of a computer system. The storage object and the selected snapshot are both included in a storage structure stored in the storage system. At block 1004, in response to the request to create the linked clone, a target storage structure that includes the linked clone with references to the selected snapshot of the storage object in the source storage structure is created without completely copying the selected snapshot of the storage object to the target storage structure. At block 1006, surface snapshots are created in the target storage structure that correspond to other snapshots of the storage object in the source storage structure with references to the other snapshots of the storage object without completely copying the other snapshots of the storage object to the target storage structure to produce the linked clone with similar snapshots as the storage object at a point in time when the selected snapshot was captured.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for creating linked clones of storage objects stored in a storage system, the method comprising:
    receiving a request to create a linked clone of a storage object using a selected snapshot of the storage object, the storage object and the selected snapshot both being included in a source storage structure in the storage system, wherein the selected snapshot is associated with other prior snapshots of the storage object that were captured prior to the selected snapshot and wherein the linked clone is a copy of the storage object and has a reference link to the selected snapshot to use information of the selected snapshot;
    in response to the request to create the linked clone, creating a target storage structure that includes the linked clone with references to the selected snapshot of the storage object in the source storage structure without completely copying the selected snapshot of the storage object to the target storage structure, including copying a root node of a B+ tree structure for the selected snapshot to the linked clone with references to other nodes of the B+ tree structure for the selected snapshot; and
    creating surface snapshots in the target storage structure that correspond to other prior snapshots of the storage object in the source storage structure with references to the other prior snapshots of the storage object without completely copying the other prior snapshots of the storage object to the target storage structure to produce the linked clone with similar prior snapshots as the storage object at a point in time when the selected snapshot was captured, including copying root nodes of the B+ tree structure for the other prior snapshots of the storage object to the surface snapshots in the linked clone with references to other nodes of the B+ tree structure for the other prior snapshots, wherein the surface snapshots in the target storage structure are pseudo copies of the other prior snapshots of the storage object in the source storage structure and have reference links to the other prior snapshots of the storage object to use information of the other prior snapshots.

2. The method of claim 1, further comprising determining an order in which the other prior snapshots of the storage object were created in the source storage structure.

3. The method of claim 2, wherein determining the order in which the other prior snapshots of the storage object were created in the source storage structure includes processing creation generation numbers for the other prior snapshots of the storage object in the source storage structure to determine the order.

4. The method of claim 3, further comprising generating new creation generation numbers for the surface snapshots in the target storage structure that correspond to the order in which the other prior snapshots of the storage object were created in the source storage structure.

5. The method of claim 3, wherein the source storage structure includes at least an archive section, a metadata section and a data section, and wherein the creation generation numbers for the other prior snapshots of the storage object are stored in the archive section of the source storage structure.

6. The method of claim 1, wherein the selected snapshot of the storage object is a first snapshot type and each of the other prior snapshots of the storage object is a second snapshot type.

7. A non-transitory computer-readable storage medium containing program instructions for creating linked clones of storage objects stored in a storage system, wherein execution of the program instructions by one or more processors of a computer system causes the one or more processors to perform steps comprising:
    receiving a request to create a linked clone of a storage object using a selected snapshot of the storage object, the storage object and the selected snapshot both being included in a source storage structure in the storage system, wherein the selected snapshot is associated with other prior snapshots of the storage object that were captured prior to the selected snapshot and wherein the linked clone is a copy of the storage object and has a reference link to the selected snapshot to use information of the selected snapshot;
    in response to the request to create the linked clone, creating a target storage structure that includes the linked clone with references to the selected snapshot of the storage object in the source storage structure without completely copying the selected snapshot of the storage object to the target storage structure, including copying a root node of a B+ tree structure for the selected snapshot to the linked clone with references to other nodes of the B+ tree structure for the selected snapshot; and
    creating surface snapshots in the target storage structure that correspond to other prior snapshots of the storage object in the source storage structure with references to the other prior snapshots of the storage object without completely copying the other prior snapshots of the storage object to the target storage structure to produce the linked clone with similar prior snapshots as the storage object at a point in time when the selected snapshot was captured, including copying root nodes of the B+ tree structure for the other prior snapshots of the storage object to the surface snapshots in the linked clone with references to other nodes of the B+ tree structure for the other prior snapshots, wherein the surface snapshots in the target storage structure are pseudo copies of the other prior snapshots of the storage object in the source storage structure and have reference links to the other prior snapshots of the storage object to use information of the other prior snapshots.

8. The computer-readable storage medium of claim 7, wherein the steps further comprise determining an order in which the other prior snapshots of the storage object were created in the source storage structure.

9. The computer-readable storage medium of claim 8, wherein determining the order in which the other prior snapshots of the storage object were created in the source storage structure includes processing creation generation numbers for the other prior snapshots of the storage object in the source storage structure to determine the order.

10. The computer-readable storage medium of claim 9, wherein the steps further comprise generating new creation generation numbers for the surface snapshots in the target storage structure that correspond to the order in which the other prior snapshots of the storage object were created in the source storage structure.

11. The computer-readable storage medium of claim 9, wherein the source storage structure includes at least an archive section, a metadata section and a data section, and wherein the creation generation numbers for the other prior snapshots of the storage object are stored in the archive section of the source storage structure.

12. The computer-readable storage medium of claim 7, wherein the selected snapshot of the storage object is a first snapshot type and each of the other prior snapshots of the storage object is a second snapshot type.

13. A computer system comprising:
a storage system having computer data storage devices to store at least one storage structure;
memory; and
a processor configured to:
  receive a request to create a linked clone of a storage object using a selected snapshot of the storage object, the storage object and the selected snapshot both being included in a source storage structure in the storage system, wherein the selected snapshot is associated with other prior snapshots of the storage object that were captured prior to the selected snapshot and wherein the linked clone is a copy of the storage object and has a reference link to the selected snapshot to use information of the selected snapshot;
  in response to the request to create the linked clone, create a target storage structure that includes the linked clone with references to the selected snapshot of the storage object in the source storage structure without completely copying the selected snapshot of the storage object to the target storage structure, including copying a root node of a B+ tree structure for the selected snapshot to the linked clone with references to other nodes of the B+ tree structure for the selected snapshot; and
  create surface snapshots in the target storage structure that correspond to other prior snapshots of the storage object in the source storage structure with references to the other prior snapshots of the storage object without completely copying the other prior snapshots of the storage object to the target storage structure to produce the linked clone with similar snapshots as the storage object at a point in time when the selected snapshot was captured, including copying root nodes of the B+ tree structure for the other prior snapshots of the storage object to the surface snapshots in the linked clone with references to other nodes of the B+ tree structure for the other prior snapshots, wherein the surface snapshots in the target storage structure are pseudo copies of the other prior snapshots of the storage object in the source storage structure and have reference links to the other prior snapshots of the storage object to use information of the other prior snapshots.

14. The computer system of claim 13, wherein the processor is configured to determine an order in which the other prior snapshots of the storage object were created in the source storage structure.

15. The computer system of claim 14, wherein the processor is configured to:
process creation generation numbers for the other prior snapshots of the storage object in the source storage structure to determine the order; and
generate new creation generation numbers for the surface snapshots in the target storage structure that correspond to the order in which the other prior snapshots of the storage object were created in the source storage structure.

* * * * *